US011161396B2

(12) United States Patent
Frischmuth et al.

(10) Patent No.: US 11,161,396 B2
(45) Date of Patent: Nov. 2, 2021

(54) MULTILAYER ARRANGEMENT FOR A FLAT SWITCHABLE GLAZING UNIT, SWITCHABLE GLAZING UNIT AND VEHICLE

(71) Applicant: Continental Automotive GmbH, Hannover (DE)

(72) Inventors: Tobias Frischmuth, Vienna (AT); Rene Hinterberger, Vienna (AT); Johannes Greil, Vienna (AT)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 111 days.

(21) Appl. No.: 16/242,215

(22) Filed: Jan. 8, 2019

(65) Prior Publication Data
US 2019/0217687 A1    Jul. 18, 2019

(30) Foreign Application Priority Data
Jan. 16, 2018   (DE) .................... 10 2018 200 659.8

(51) Int. Cl.
*B60J 3/04*         (2006.01)
*E06B 3/67*         (2006.01)
(Continued)

(52) U.S. Cl.
CPC ............... *B60J 3/04* (2013.01); *E06B 3/6722* (2013.01); *E06B 9/24* (2013.01); *G02F 1/155* (2013.01);
(Continued)

(58) Field of Classification Search
CPC . G02F 1/155; G02F 1/15; G02F 1/153; G02F 1/1533; G02F 1/15165;
(Continued)

(56) References Cited

U.S. PATENT DOCUMENTS 4,874,229 A    10/1989  Ito et al.
6,317,248 B1 *  11/2001  Agrawal ................. G02F 1/155
                                                    340/438
(Continued)

FOREIGN PATENT DOCUMENTS

CN    101300523 A    11/2008
CN    101589485 A    11/2009
(Continued)

OTHER PUBLICATIONS

German Examination Report for German Application No. 10 2018 200 659.8, dated Sep. 12, 2018—7 pages.
(Continued)

*Primary Examiner* — Jie Lei
(74) *Attorney, Agent, or Firm* — RatnerPrestia

(57) ABSTRACT

A multilayer arrangement for a flat glazing unit. The multilayer arrangement extends in a main plane and has at least one narrow side, wherein the multilayer arrangement has a functional layer, layer electrodes are arranged on surface sides of the functional layer, which surface sides are oriented parallel in relation to the main plane, the layer electrodes each have at least one contact-making surface which is oriented parallel in relation to the main plane and on which a respective common supply electrode, which is different from the respective layer electrode, is arranged along a respective contact-making edge, and the contact-making edges are each at least a subregion of the narrow side. The invention also makes provision for at least portions of the contact-making surfaces to at least partially overlap as seen perpendicularly in relation to the main plane and/or for the supply electrodes to each have a comb structure.

13 Claims, 7 Drawing Sheets

(51) Int. Cl.
*G02F 1/155* (2006.01)
*E06B 9/24* (2006.01)
*B60J 1/08* (2006.01)

(52) U.S. Cl.
CPC .......... *B60J 1/08* (2013.01); *E06B 2009/2464* (2013.01); *G02F 2201/122* (2013.01)

(58) Field of Classification Search
CPC ...... G02F 1/1521; G02F 1/1523; G02F 1/163; G02F 1/13439; G02F 1/1345; G02F 1/01; G02F 2201/122; E06B 3/6722; E06B 9/24; E06B 3/67; E06B 2009/2464; B60J 3/04; B60J 1/08; B82Y 10/00; B82Y 20/00
USPC ............... 359/265, 275, 261, 254, 266, 270; 977/720, 730, 762, 767, 768
See application file for complete search history.

(56) References Cited

U.S. PATENT DOCUMENTS

| | | | |
|---|---|---|---|
| 8,179,036 | B2 | 5/2012 | Eser et al. |
| 8,717,658 | B2 | 5/2014 | Bergh et al. |
| 8,760,749 | B2 | 6/2014 | Melcher et al. |
| 8,781,676 | B2 | 7/2014 | McIntyre, Jr. et al. |
| 9,091,895 | B2 | 7/2015 | Bergh et al. |
| 9,507,233 | B2 | 11/2016 | Bergh et al. |
| 2012/0033367 | A1 | 2/2012 | Jones et al. |
| 2012/0147448 | A1 | 6/2012 | Yaniv et al. |
| 2018/0173035 | A1* | 6/2018 | Port ................... G02F 1/13439 |

FOREIGN PATENT DOCUMENTS

| | | |
|---|---|---|
| CN | 102472941 A | 5/2012 |
| CN | 102681175 A | 9/2012 |
| CN | 103163706 A | 6/2013 |
| CN | 205643980 U | 10/2016 |
| CN | 106873281 A | 6/2017 |
| CN | 107045242 A | 8/2017 |
| DE | 102014210303 A1 | 12/2014 |
| JP | 59184328 A | 10/1984 |

OTHER PUBLICATIONS

Hsu et al., "Performance Enhancement of Metal Nanowire Transparent Conducting Electrodes by Mesoscale Metal Wires", Nature Communications, published Sep. 25, 2013—pp. 1-7.

Kim et al., "Highly Transparent Low Resistance ZnO/Ag Nanowire/ ZnO Composite Electrode for Thin Film Solar Cells", ACS Nano, 2013, vol. 7, No. 2—pp. 1081-1091.

Zilberberg et al., "Highly Robust Indium-free Transparent Conductive Electrodes Based on Composites of Silver Nanowires and Conductive Metal Oxides", Adv. Funct. Mater., 2014, vol. 24—pp. 1671-1678.

Chinese Office Action for Chinese Application No. 201910029628. 7, dated May 21, 2021, with translation, 16 pages.

* cited by examiner

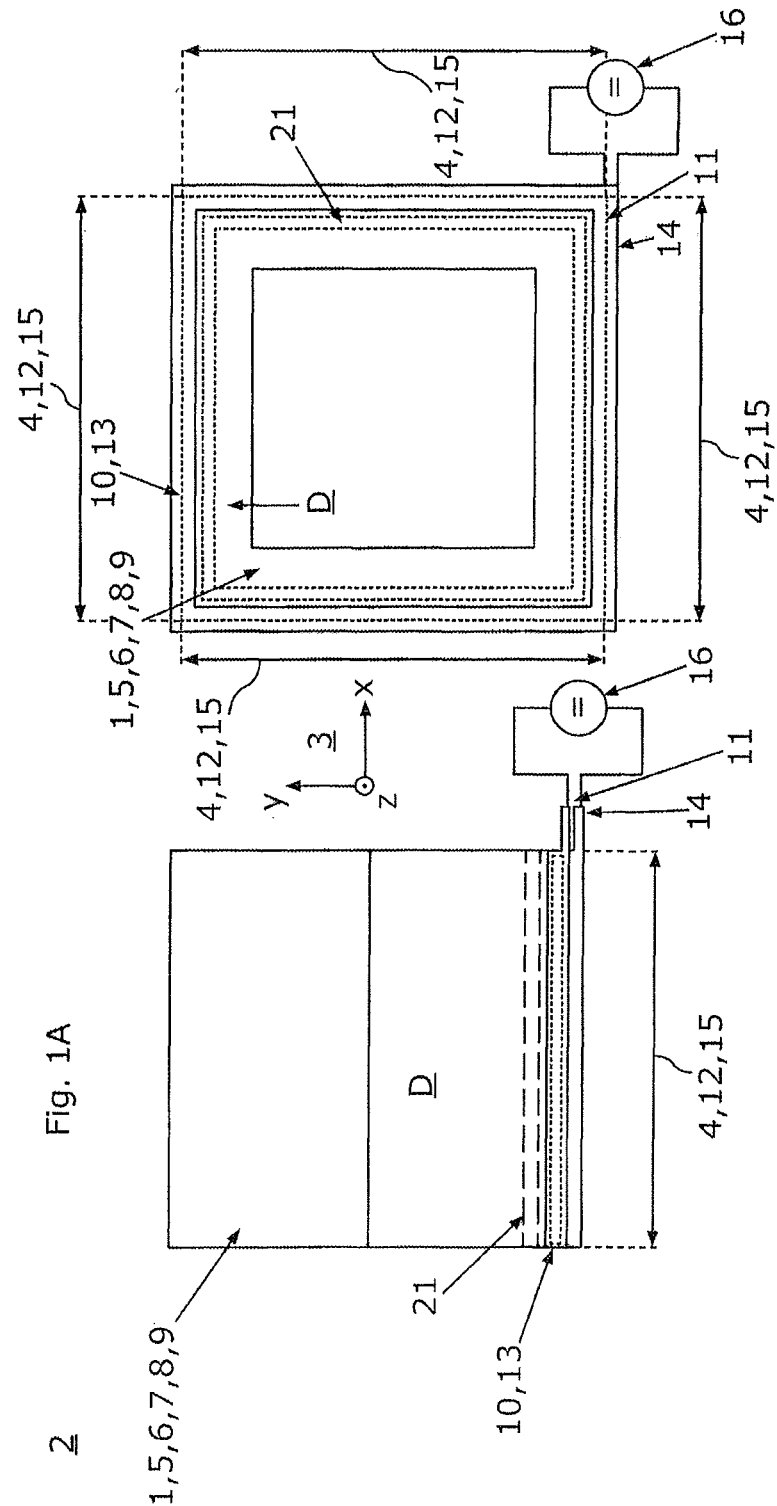

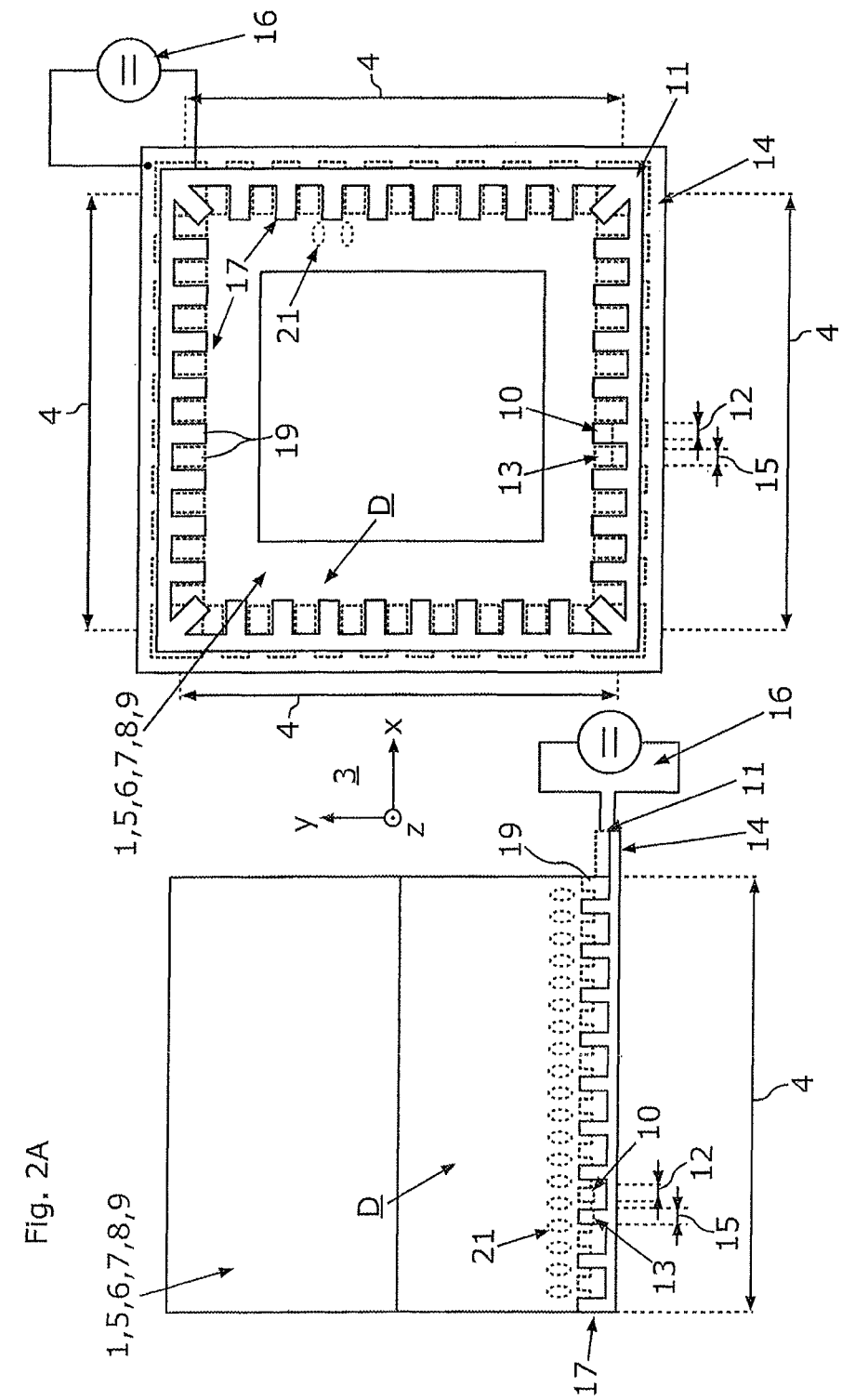

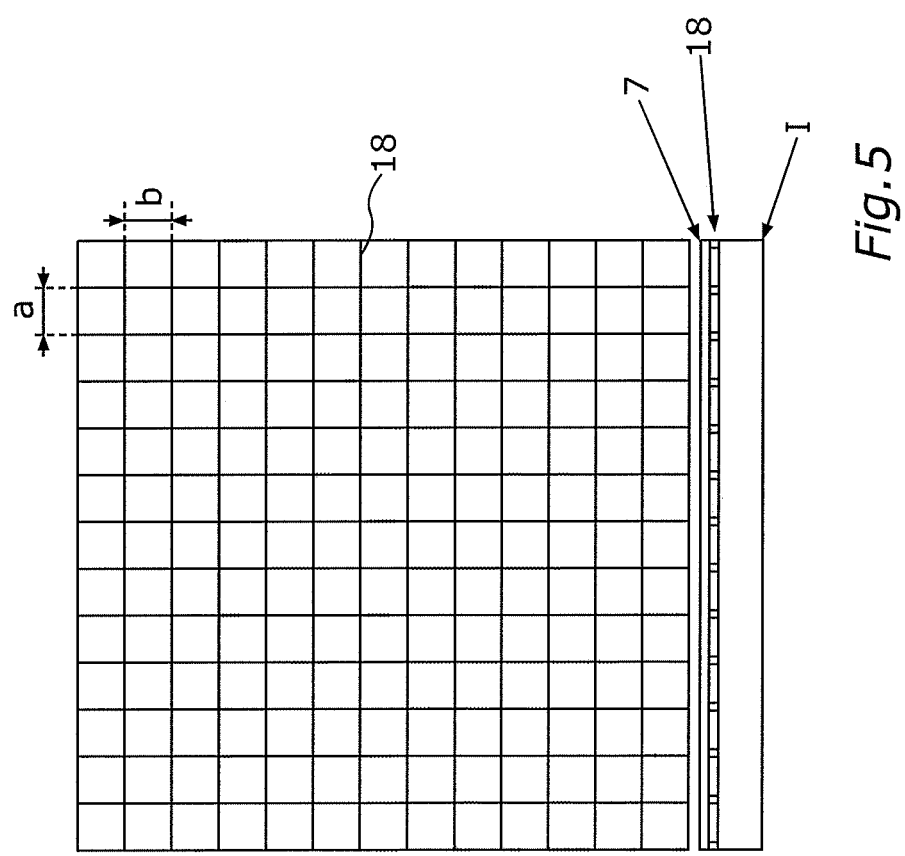

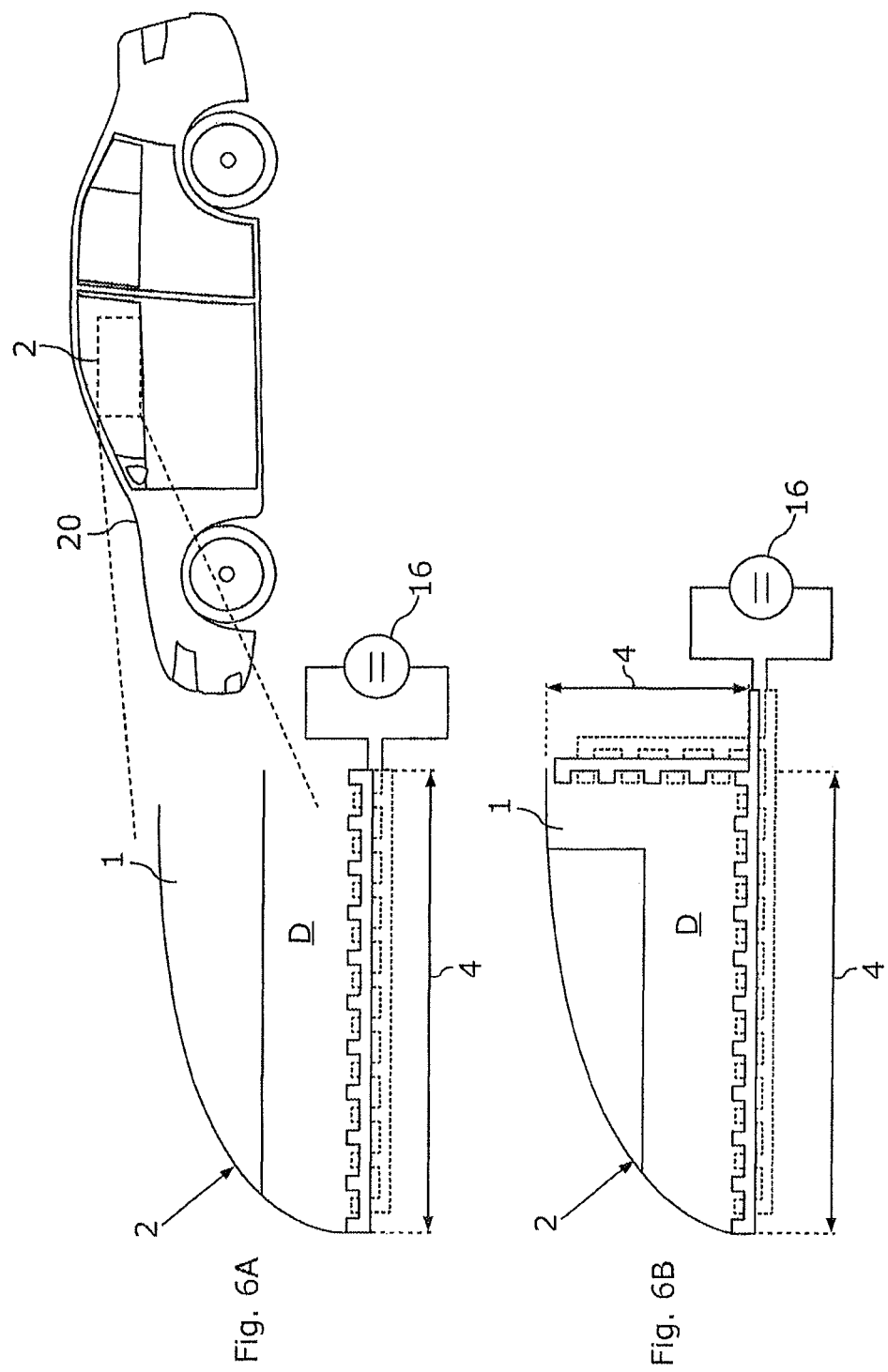

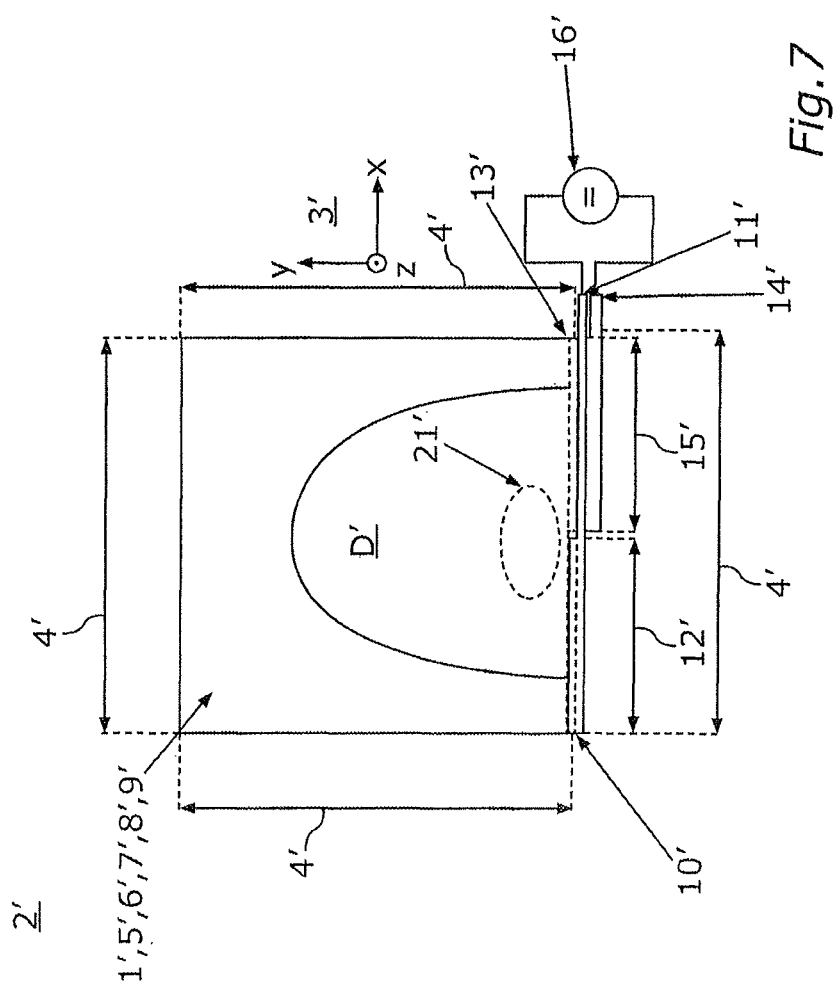

MULTILAYER ARRANGEMENT FOR A FLAT SWITCHABLE GLAZING UNIT, SWITCHABLE GLAZING UNIT AND VEHICLE

CROSS REFERENCE TO RELATED APPLICATION

This application claims priority to German Patent Application No. 10 2018 200 659.8, filed Jan. 16, 2018, the contents of such application being incorporated by reference herein.

FIELD OF THE INVENTION

The invention relates to a multilayer arrangement for a flat switchable glazing unit, to a switchable glazing unit and to a vehicle.

BACKGROUND OF THE INVENTION

Switchable glazing units are glazing units of which the transparency to light can be switched. This is done, for example, using electrochromic materials. Electrochromic materials have the property of changing their transparency with respect to light depending on a current flow or an electrical field. In the case of flat glazing units, such as windows for example, this property is used to render possible controllable darkening and/or transparency and/or coloring of the glazing unit. In this case, a functional layer, which contains the electrochromic material, is usually arranged between two transparent layer electrodes which are intended to provide the required electrical field or the electric current for the functional layer.

If an electrical potential distribution which is as homogeneous as possible is required on transparent conductive electrode surfaces, such as layer electrodes of a switchable glazing unit for example, this constitutes, on account of the limited conductivity of known transparent electrode materials, a major challenge since electrical potential differences are produced in the electrode plane in the event of current flow through the electrode. Particularly for the most common transparent electrode material indium tin oxide (ITO), an inhomogeneous potential distribution may occur on a layer electrode given electrochromic switchable foils and glazing units. This results in an inhomogeneous current distribution in the electrochromic functional layer and, as a result of this, in an optically inhomogeneous switchover behavior, which is also known as the "iris effect".

A further problem which is also caused on account of the inhomogeneous current density distribution concerns the reliability and durability of the functional layer. When there is an excessive current density through the functional layer in the direction of the normal of the main plane, degradation of the functional layer is possible. This can lead to aging, to coloring or to failure of the switchable function of the functional layer. If the current density distribution is not homogeneous, it is therefore necessary to actuate the glazing unit in such a way that no technologically specific critical value is exceeded by the local current density in the direction of the normal of the main plane over the entire surface because otherwise said degradation phenomena may occur. It should be noted here that as high as possible a total current flow through the functional layer would be preferred because the switchover time can be minimized as a result.

U.S. Pat. No. 9,091,895 B2, incorporated herein by reference, describes an electrochromic multilayer apparatus with combined electrically conductive layers. In this case, provision is made to adjust an electrical resistance of a first electrically conductive layer in a location-dependent manner and/or to apply a second electrically conductive layer in order to avoid inhomogeneous switchover of the electrochromic layer.

SUMMARY OF THE INVENTION

One aspect of the invention aims to render possible homogeneous switchover of an electrochromic functional layer.

A first aspect of the invention provides a multilayer arrangement for a flat switchable glazing unit. The flat glazing unit can be, for example, a window pane. In this case, the multilayer arrangement can be arranged, for example, within the glazing unit or on the glazing unit. The multilayer arrangement extends in a main plane, that is to say the plane of the greatest extent, and has at least one border or one narrow side. The main plane can be oriented parallel in relation to the surface of the glazing unit. The narrow side is a side which delimits a surface of the multilayer arrangement in the main plane.

The multilayer arrangement contains a functional layer, wherein a first layer electrode is preferably arranged on a first surface side of the functional layer, which surface side is oriented parallel in relation to the main plane, so as to cover the entire surface area, and a second layer electrode is preferably arranged on a second surface side of the funcional layer, which second surface side is oriented parallel in relation to the main plane and is situated opposite the first surface side, so as to cover the entire surface area. Therefore, the functional layer is coated on either side with in each case one of the layer electrodes. An arrangement of this kind is also known by the term sandwich arrangement. The layers are, in particular, transparent to light.

The first layer electrode has at least one first contact-making surface which is oriented parallel in relation to the main plane and on which a common first supply electrode, which is different from the layer electrode, is arranged along a first contact-making edge. "Common" means that one and the same supply electrode is provided for making contact with each contact-making surface. The second layer electrode has at least one second contact-making surface which is oriented parallel in relation to the main plane and on which a common second supply electrode is arranged along a second contact-making edge. The contact-making surfaces can be surfaces on which the supply electrodes, which are also known as "busbars", are applied or arranged or make contact with the respective layer electrode. The contact-making surfaces can be arranged on or along a respective contact-making edge. The supply electrodes can be electrodes which are designed to make electrical contact with the respective layer electrode.

The supply electrodes can be composed of a material which preferably has a higher electrical conductivity than the layer electrodes. Furthermore, the supply electrode can have a greater layer thickness and/or can be opaque. The first contact-making edge and the second contact-making edge are each at least a subregion of said narrow side. Therefore, the contact-making edges can lie on or along the narrow side. In this case, at least a portion of the at least one first contact-making surface and at least a portion of the at least one second contact-making surface at least partially overlap as seen perpendicularly in relation to the main plane. In addition or as an alternative to this, the supply electrodes each have a comb structure, that is to say each of the supply electrodes makes contact with the respectively associated layer electrode on a plurality of the contact-making surfaces.

In other words, in the case of an aspect of the invention, the multilayer arrangement is generally oriented parallel in relation to the main plane and delimited in respect of its extent along the main plane by the at least one narrow side or edge. The multilayer arrangement contains the functional layer, the layer electrodes preferably being arranged over the entire surface area on the surface sides of said functional layer parallel in relation to the main plane. In this case, the second layer electrode is arranged on the surface side opposite the first layer electrode. In each case one of the supply electrodes is associated with a respective layer electrode, said one supply electrode making electrical contact with the respective layer electrode on at least the respective contact-making surface. The respective at least one contact-making surface is arranged on the respective contact-making edge, wherein the contact-making edges are part of the narrow side. Therefore, the contact-making surfaces are arranged on or along the narrow side. It is important that at least a portion of the at least one first contact-making surface and at least a portion of the at least one second contact-making surface overlap when viewed from a direction normal to the main plane. Therefore, a current can flow from the first layer electrode to the second layer electrode perpendicularly through the functional layer. In addition or as an alternative to the overlap, the supply electrodes are in the form of a comb. Therefore, they have a comb structure. Therefore, each layer electrode has a plurality of said contact-making surfaces, wherein a respective one of the fingers of the comb is arranged on one of the respective contact-making surfaces.

Overall, this has the advantage that a region with a more homogeneous current density distribution is formed along the contact-making surfaces, as a result of which the magnitudes of local current density maxima are reduced. Therefore, it is possible to increase a total current flow while maintaining maximum current densities, as a result of which more rapid and more homogeneous switching over of glazing units is rendered possible.

A multilayer arrangement can be, for example, an arrangement of individual layers which has a surface area of more than 10 square centimeters or more than one square meter parallel in relation to the main plane and is delimited in respect of its extent in the main plane by at least the one narrow side. The thickness of the multilayer arrangement, that is to say the dimension of the multilayer arrangement in a direction normal to the main plane, can be, for example, more than 10 micrometers or more than one millimeter. Said thickness is, of course, smaller than the extent along the main plane. The multilayer arrangement can contain the functional layer. The functional layer can be a layer which assumes a desired state or a desired property, for example, in an electrical field or in the case of an electric current. In order for it to be possible, for example, to generate the electrical field or provide an electric current for the functional layer, the functional layer can be completely coated with the first layer electrode on the first surface side. The functional layer can be completely coated with the second layer electrode opposite the first surface side. The layer electrodes can be composed of an electrically conductive material and be applied to the functional layer, for example, by means of an atomizing process, an evaporation process or a spraying process or as a foil. The first layer electrode can have the first contact-making surface along the first contact-making edge. The first layer electrode can be electrically conductively connected to the first supply electrode on the at least one first contact-making surface. The at least one first contact-making surface can be arranged on the first contact-making edge on the narrow side. The respective contact-making surface can be completely coated or covered with the respective supply electrode. Analogously to the at least one first contact-making surface, the second layer electrode can have at least the second contact-making surface on which the second layer electrode can be electrically conductively connected to the second supply electrode. The at least one second contact-making surface can also be delimited by the second contact-making edge on the narrow side. The supply electrodes can be applied, for example, to the layer electrodes by means of a spraying process or can be soldered to the layer electrode and can be composed of copper or aluminum for example. Said supply electrodes can also be pushed in or clamped in. The supply electrodes can be used to apply a predetermined electrical potential to the respective layer electrode. The first contact-making edge and the second contact-making edge can be subregions of the narrow side. Therefore, the at least one first contact-making surface and the at least one second contact-making surface can be arranged opposite one another and at least partially overlap or be directly opposite one another.

One development of an aspect of the invention makes provision for the layer electrodes to be arranged between the supply electrodes. In other words, the respective layer electrode is arranged in such a way that it is arranged between the functional layer and the respective supply electrode along a direction normal to the main plane. This has the advantage that the production process can be made simpler because an outer arrangement of the supply electrodes is easier to implement than an inner arrangement of the supply electrodes. Therefore, provision can be made for layers of the multilayer arrangement to be folded over in the contact-making region, as a result of which at least one layer electrode forms an outer surface of the multilayer arrangement. The supply electrode can be applied to this layer electrode.

In contrast, one development of an aspect of the invention makes provision for the supply electrodes to be arranged between the layer electrodes. In other words, the respective supply electrode is arranged in such a way that it is arranged between the layer electrodes along a direction normal to the main plane. This has the advantage that the supply electrodes can be inserted into the functional layer. Therefore, it is possible for the layer thickness of the functional layer in the region of the contact-making surface to be thinner than in the rest of the surface of the multilayer arrangement. The supply electrode can be applied in the contact-making surface in such a way that it compensates for the smaller layer thickness, as a result of which the multilayer arrangement can have a constant layer thickness overall.

One development of an aspect of the invention makes provision for the first supply electrode and/or the second supply electrode to have a comb structure having a plurality of finger elements or fingers for short, wherein each of the fingers rests against in each case one of the contact-making surfaces. In other words, the first supply electrode and/or the second supply electrode have/has a surface which is oriented parallel in relation to the main plane, wherein the surface can have an elongate base surface on which a plurality of fingers are arranged as protruding partial surfaces or projections. The fingers, which are also called tines, can be in the form of a bar and can be arranged in the contact-making surface on the respective electrode layer. This has the advantage that a contact-making connection is provided, which contact-making connection requires a simpler production method than a continuous contact-making connection, but has a similar current density distribution in this case. Therefore, provision can be made for clearances to be made in the functional layer along the contact-making edge, it being possible to apply the fingers of the supply electrode into said clearances.

One development of an aspect of the invention makes provision for the first supply electrode and the second supply electrode to have said comb structure, wherein the fingers of the comb structures are arranged in an alternating order along a direction which runs parallel in relation to the contact-making edge. Therefore, the comb structures are arranged in a manner interleaved with one another. In other words, the second supply electrode is arranged, with respect to the first supply electrode, along the contact-making edge such that one of the fingers of the first supply electrode or one of the fingers of the second supply electrode makes contact with the respective layer electrode in an alternating order. This has the advantage that the current flow density is minimized. Therefore, provision can be made for either one of the fingers of the first supply electrode to make contact with the first layer electrode or one of the fingers of the second supply electrode to make contact with the second layer electrode along one direction in an alternating order. Therefore, one of the fingers of the first supply electrode has only one of the fingers of the second supply electrode as a direct neighbor, and one of the fingers of the second supply electrode has only one of the fingers of the first supply electrode as a direct neighbor.

One development of an aspect of the invention makes provision for the functional layer to comprise an electrochromic material. In other words, the functional layer contains a material of which the transparency is dependent on an electrical voltage which is applied to the layer electrodes or on the charge introduced into the layer. This has the advantage that the transparency of the multilayer arrangement can be adjusted by applying a voltage or introducing a charge. Therefore, the functional layer can comprise, for example, tungsten(VI) oxide or polyaniline.

One development of an aspect of the invention makes provision for the first layer electrode and/or the second layer electrode to be transparent in the visible region. In other words, the first layer electrode and/or the second layer electrode can transmit light. This has the advantage that the multilayer arrangement can be used as functional glass. Therefore, the layer electrodes can comprise, for example, a transparent conductive oxide.

One development of an aspect of the invention makes provision for a line structure to be arranged on a surface side of the first layer electrode and/or of the second layer electrode. In other words, a structure composed of a conductive material is applied to one or both layer electrodes. This has the advantage that the conductivity of the multilayer arrangement is increased by way of a further layer. Therefore, for example, a pattern comprising gold can be applied to one of the layer electrodes.

One development of an aspect of the invention makes provision for the first layer electrode and/or the second layer electrode and/or the line structure to have nanoflakes and/or nanowires. In other words, the layer electrode and/or the line structure contain/contains structures comprising nanowires and/or nanoflakes. This has the advantage that a highly conductive but non-transparent material can be used in order to provide an electrically conductive and, at the same time, transparent layer.

One development of an aspect of the invention makes provision for the first layer electrode and/or the second layer electrode and/or the line structure to have a microwire structure. In other words, the layer electrodes and/or the line structure contain/contains a lattice comprising microwires. This has the advantage that a highly conductive but non-transparent material can be used in order to provide an electrically conductive and, at the same time, transparent layer.

One development of an aspect of the invention makes provision for the microwire structure to be in the form of an electrode matrix. In other words, the microwire structure has rows and columns to which, independently of one another, a voltage can be applied. This has the advantage that local actuation of the multilayer arrangement is rendered possible. Therefore, provision can be made, for example, for a voltage to be able to be applied only to the microwires which run through a predetermined area. As a result, a desired effect can be limited to subregions of the multilayer arrangement.

A second aspect of the invention relates to a switchable glazing unit comprising a multilayer arrangement according to one of the preceding embodiments.

An aspect of the invention also covers a motor vehicle comprising a switchable glazing unit according to an aspect of the invention and/or a multilayer arrangement according to one of the preceding embodiments.

BRIEF DESCRIPTION OF THE DRAWINGS

An exemplary embodiment of the invention is described below. In this regard, in the figures:

FIGS. 1A and 1B show possible multilayer arrangements comprising overlapping supply electrodes in a plan view of the main plane;

FIGS. 2A and 2B show two possible comb structures of supply electrodes of the multilayer arrangement;

FIG. 5 shows a possible conductor structure;

FIGS. 6A and 6B show two possible, flat switchable glazing units and a motor vehicle according to one embodiment; and FIG. 7 shows a possible multilayer arrangement comprising supply electrodes according to the prior art.

In the figures, functionally identical elements are each provided with the same reference symbols.

DETAILED DESCRIPTION OF THE PREFERRED EMBODIMENTS

For the purpose of explaining the problem on which an aspect of the invention is based, FIG. 7 shows a possible multilayer arrangement 1' comprising supply electrodes 11', 14' according to the prior art in a plan view of a main plane 3'. A coordinate system comprising axes x, y, z which are orthogonal in relation to one another is illustrated for orientation purposes. The multilayer arrangement 1' is arranged in the main plane 3' in the x, y plane and has four narrow sides 4'. The multilayer arrangement 1' contains a functional layer 5', it being possible for layer electrodes 7', 9' to be applied to the opposite surface sides 6', 8' of said functional layer, wherein said elements are situated one behind the other in the plan view illustrated and extend parallel in relation to the plane of the illustration in the figure. The first layer electrode 7' has a first contact-making surface 10' which is delimited by a first contact-making edge 12' on a narrow side 4'. The second layer electrode 9' has a second contact-making surface 13' (on the averted rear side in FIG. 7) which is delimited by a second contact-making edge 15' on the same narrow side 4'. A first supply electrode 11' is arranged on the first contact-making surface 10' over the entire surface area of the first contact-making surface 10'. A second supply electrode 14' is arranged on the second contact-making surface 13' over the entire surface area of the second contact-making surface 13'. The contact-making surfaces 10', 13' are arranged along the same narrow side 4', without overlapping as viewed in a plan view of the main plane 3'. The supply electrodes 11', 14' are electrically conductively connected to a voltage source 16' and can be composed of copper or aluminum for example. An applied voltage implements darkening of the functional layer 5'. The extent and/or the speed of switching over of the darkened portion D' can be inhomogeneously distributed over the surface of the functional layer 5'. This can be attributed to there being an inhomogeneous distribution of the current flow density between the first contact-making surface 10' and the second contact-making surface 13'. In particular, a region 21' of relatively high current flow density can be formed, it being possible for said region to be produced in a region close to the transition between the two contact-making surfaces 10', 13'. The incidence of the region 21' of relatively high current flow density limits the possible total current flow and can lead to damage to the functional layer 5'. For this reason, it is desirable to reduce the surface area or number of regions 21' of this kind in order to minimize the value of the relatively high current flow density.

Figure 3A:
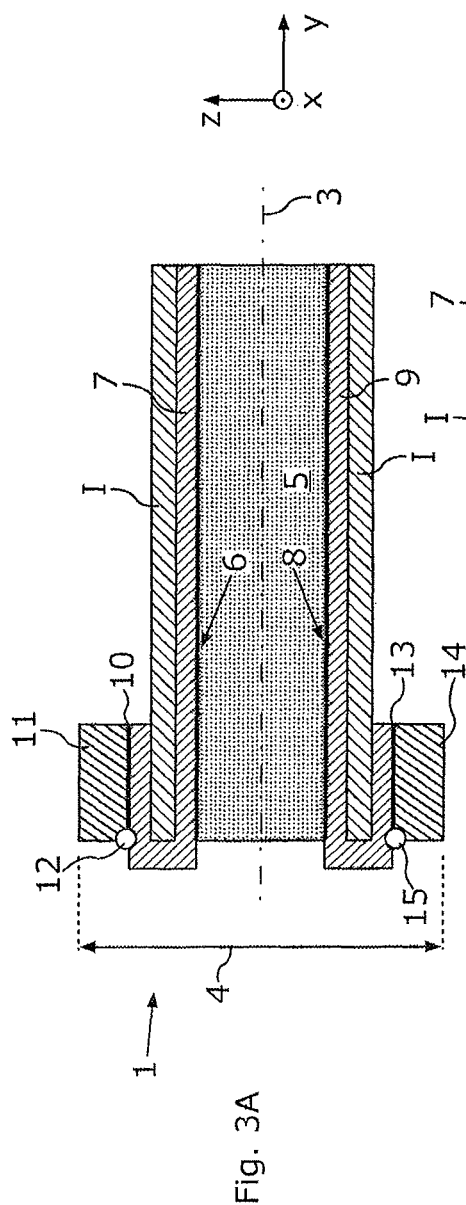
FIGS. 3A-3C show possible arrangements of the supply electrodes in a sectional view perpendicular to the main plane.
Figure 3B:
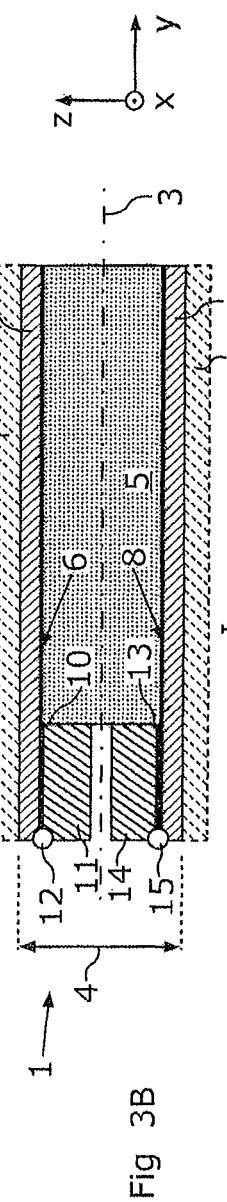

FIG. 1 shows, using the illustrations A and B, two possible multilayer arrangements 1 comprising supply electrodes 11, 14, which overlap in the z direction, in comparison. A coordinate system comprising axes x, y, z which are orthogonal in relation to one another is once again illustrated for orientation purposes. The multilayer arrangements 1 can each be a constituent part of a switchable glazing unit 2. In this case, the multilayer arrangement 1 can in each case extend in a main plane 3, which lies in the x, y plane, and have, for example, four boundary sides or narrow sides 4 by way of which the multilayer arrangement 1 can be delimited in the main plane 3. For reasons of clarity, only one of the narrow sides 4 is indicated in FIG. 1 by way of example. Reference is additionally made to FIGS. 3A and 3B for the following description. The multilayer arrangement 1 can have the functional layer 5, wherein the functional layer 5 can have two opposite surface sides 6, 8 which are oriented parallel in relation to the main plane 3. The functional layer 5 can comprise, for example, an electrochromic material. The first layer electrode 7 can be arranged on the first surface side 6 of the two opposite surface sides. The second layer electrode 9 can be arranged on the opposite second surface side 8. The layer electrodes 7, 9 can be transparent at least in the visible region. For this purpose, said layer electrodes can be composed of or comprise the transparent and electrically conductive oxide indium tin oxide for example. The layer electrodes 7, 9 can each have contact-making surfaces 10, 13, it being possible for the supply electrodes 11, 14 to be respectively arranged on said contact-making surfaces. A respective supply electrode 11, 14 can be composed of or comprise copper or aluminum for example. The contact-making surfaces 10, 13 can have a respective contact-making edge 12, 15 on the at least one narrow side 4, wherein said contact-making edges can each be subregions of the narrow side 4.

The illustration a) in FIG. 1 of the multilayer arrangement 1 has two supply electrodes 11, 14 which can be arranged on the two contact-making surfaces 10, 13 along the same narrow side 4. The contact-making surfaces 10, 13 can cover, for example, less than 10% of the surface area of one of the respective surface sides 6, 8. The supply electrodes 11, 14 can electrically conductively connect a voltage source 16 to the layer electrodes 7, 9. When a voltage is applied, a region 21 of relatively high current flow density can be formed on the layer electrodes 7, 9 normal to the main plane 3. As a result of the contact-making surfaces 10, 13 overlapping in the normal direction to the main plane 3 along the narrow side 4, the region 21 of relatively high current flow density has lower values than in the case of the multilayer arrangement 1' of the prior art illustrated in FIG. 7. On account of the fact that the multilayer arrangement 1 is contacted by the supply electrodes 11, 14 along the entire narrow side 4 in the embodiment shown, propagation of a darkened portion D or of a darkened region can take place in a homogeneous manner from the narrow side 4 in the event of switching over of the electrochromic functional layer 5.

The multilayer arrangement 1 of the illustration b) in FIG. 1 has two supply electrodes 11, 14 which are arranged on the two contact-making edges 12, 15 along the four narrow sides 4. On account of the relatively wide contact-making edges 12, 15 over all of the narrow sides 4 of the multilayer arrangement 1, it may be possible for the region 21 of relatively high current flow density to have lower values than the arrangement on the multilayer arrangement 1 under a) since the region extends over a greater length. On account of contact being made with the layer electrodes 7, 9 on all of the narrow sides 4, the darkened portion D may propagate in a homogeneous manner from all of the narrow sides 4 into the center in the event of switching over in the electrochromic functional layer 5.

Figure 3C:
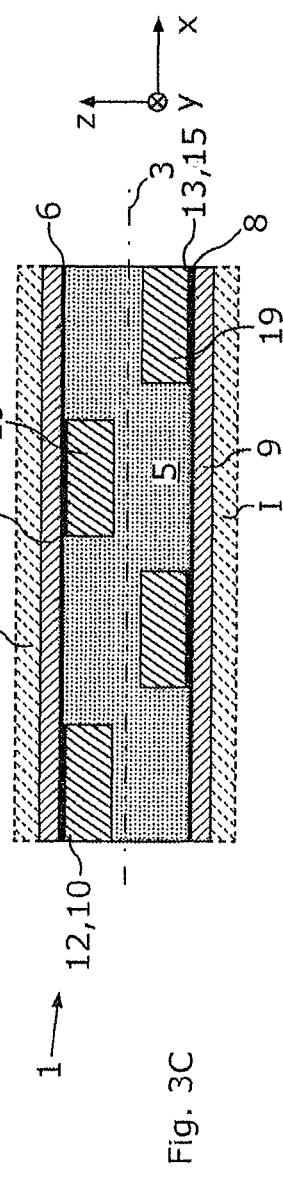

FIG. 2 shows illustrations A and B of two possible comb structures 17 of supply electrodes 11, 14 in comparison. Reference is additionally made to FIG. 3C for the following description. The multilayer arrangements 1 of illustrations a), b) contain the functional layer 5, it being possible for the layer electrodes 7, 9 to be applied to the opposite surface sides 6, 8 of said functional layer, wherein the elements of the multilayer arrangement 1 are situated one behind the other in the plan view illustrated and extend parallel in relation to the plane of the illustration in FIG. 2. The multilayer arrangements 1 have the two supply electrodes 11, 14 which can be arranged on the two contact-making surfaces 10, 13 along at least the same narrow side 4. The contact-making surfaces 10, 13 can cover, for example, less than 10% of the surface area of the respective surface side 6, 8. The supply electrodes 11, 14 can electrically conductively connect the voltage source 16 to the layer electrodes 7, 9. The contact-making surfaces 10, 13 of the multilayer arrangement 1 of the illustration a) are arranged along the narrow side 4 of the multilayer arrangement 1. The first supply electrode 11 and the second supply electrode 14 each have the comb structure 17. It may be the case that the respective comb structure 17 has a base surface on which a plurality of, for example cuboidal, fingers 19 can be arranged. One of the respective fingers 19 can be arranged on the respective contact-making surface 10, 13 of the respective layer electrode 7, 9. The comb structures 17 can be arranged such that the fingers 19 of the two supply electrodes 11, 14 have an alternating arrangement in relation to one another along the narrow side 4 and do not overlap in the direction of the base surface normal. Therefore, the comb structures 17 can be interleaved with one another. On account of this arrangement, it may be the case that the regions 21 of relatively high current flow density are formed between the fingers 19 of the respective supply electrodes 11, 14.

The multilayer arrangement 1 of the illustration b) shows two comb structures 17 which each run along four narrow sides 4. As a result, the maximum current flow density in comparison to the multilayer arrangement 1 of the illustration a) is reduced since the regions 21 of relatively high current flow density have a greater total surface area.

FIG. 3 shows possible arrangements of the supply electrodes 11, 14 within the multilayer arrangement 1. The three illustrations a), b) and c) of FIG. 3 show respective possible arrangements of the supply electrodes 11, 14 on the layer electrodes 7, 9. The multilayer arrangement 1 can have, for example, the functional layer 5, the two layer electrodes 7, 9 and two substrate layers I. It may be the case that the supply electrodes 11, 14, as depicted in the illustration a), are arranged outside the layer electrodes 7, 9. The supply electrodes 11, 14, as depicted in the illustration b), can be arranged between the layer electrodes 7, 9 and separated from one another by a gap. The illustration c) shows a possible arrangement of the supply electrodes 11, 14 in the case of the comb structure 17 with fingers 19 which are arranged in an alternating manner in relation to one another. One advantage of this arrangement is that the supply electrodes 11, 14 can be between the layer electrodes 7, 9 of the multilayer arrangement 1, wherein the alternating arrangement of the fingers 19 can make it possible to produce the multilayer arrangement 1 more easily. Provision may be made for the multilayer arrangement 1 according to the illustrations b) and c) to each likewise have an insulating layer or substrate layer I on one or both sides, as is illustrated by a dashed-line illustration in FIG. 3.

Figure 4:
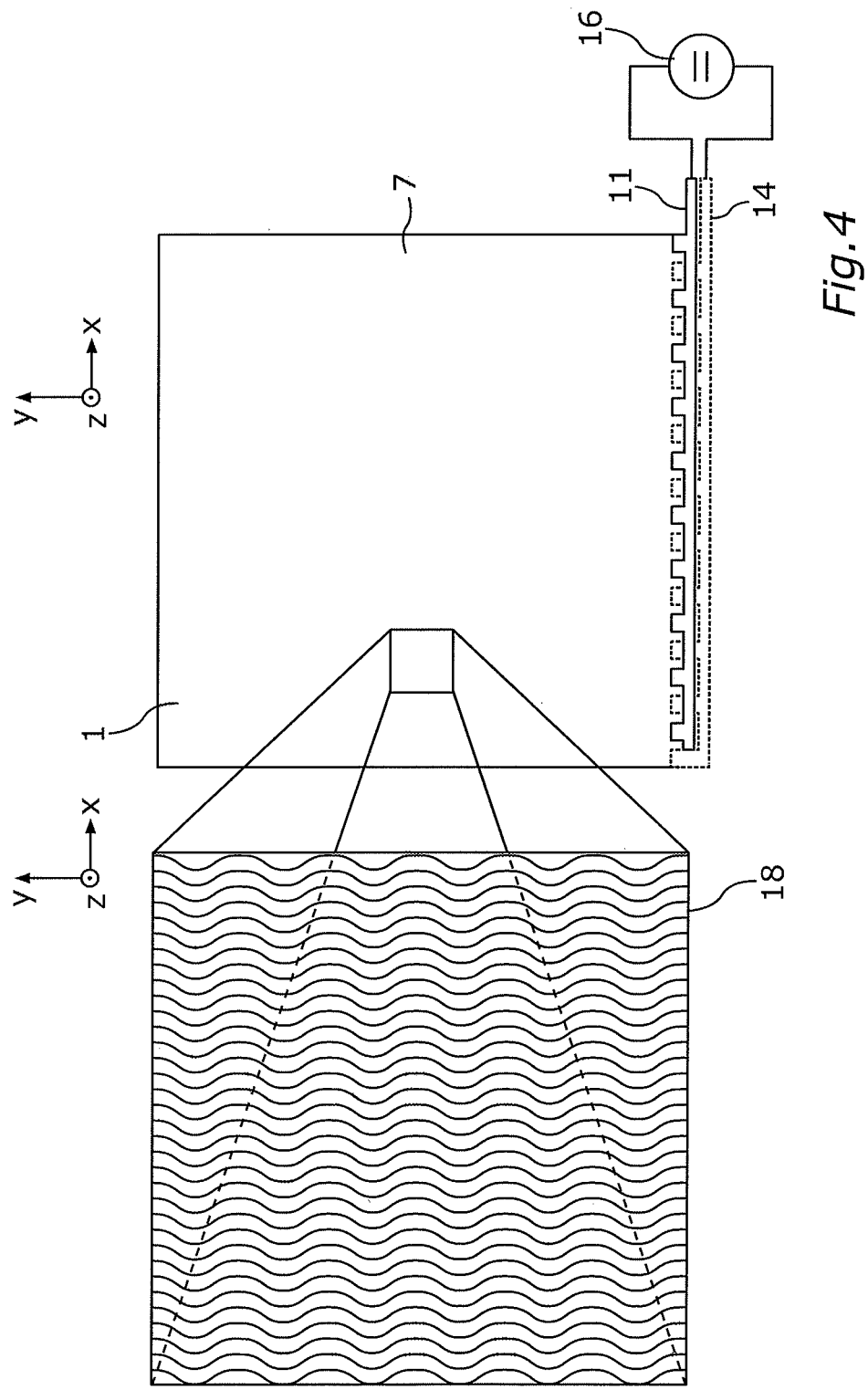
FIG. 4 shows a possible conductor structure.

FIG. 4 shows a possible conductor structure 18 which can be arranged on the respective layer electrodes 7, 9, this being illustrated here for the layer electrode 7 which is shown from the perspective illustrated in FIG. 4 in an enlarged detail on the left-hand side. The conductor structure 18 may comprise, for example, nanowires or nanoflakes which can form an electrically conductive structure on the layer electrodes 7, 9. It may be the case that the layer electrodes 7, 9 are each arranged between the conductor structure 18 and the functional layer 5. As a result, it may be the case that there is no direct contact between the conductor structure 18 and the functional layer 5. This may be advantageous if, for example, the material of the conductor structure 18 is not compatible with a material of the functional layer 5.

FIG. 5 shows a possible conductor structure 18 which has a microwire structure which can constitute an electrode matrix. Said figure shows a plan view and, beneath said plan view, a front view of a cross section through a portion of the multilayer arrangement 1 which contains the layer electrode 7, the conductor structure 18 and the substrate layer I. The microwire structure can comprise microwires which form a lattice with lattice spacings a, b in two directions of the plane, wherein a respective microwire can be a row or a column of the electrode matrix. As a result, the conductor structure 18 can be provided such that it is possible to apply a voltage to selected subregions. The conductor structure 18 can be arranged on the layer electrode 7, for example, such that it is arranged between the layer electrode 7 and the substrate layer I. The conductor structure 18 can be covered, for example, by a foil as substrate layer I.

FIGS. 6A and 6B show two possible flat switchable glazing units 2 and a motor vehicle 20 according to one embodiment. The switchable glazing units 2 can be, for example, windows of the motor vehicle 20. A flat switchable glazing unit can be formed in each case as glass, the multilayer arrangement 1 being arranged on the surface of said glass or in the inside of said glass so as to cover the entire surface area. In this case, the multilayer arrangement 1 can be contacted on one or two of the narrow sides 4.

Overall, the example shows how homogeneous switching over of an electrochromic layer can be rendered possible by an aspect of the invention.

LIST OF REFERENCE SYMBOLS

D Darkened portion
I Substrate layer
a Lattice spacing
b Lattice spacing
1 Multilayer arrangement
2 Glazing unit
3 Main plane
4 Narrow side
5 Functional layer
6 Surface side
7 Layer electrode
8 Surface side
9 Layer electrode
10 Contact-making surface
11 Supply electrode
12 Contact-making edge
13 Contact-making surface
14 Supply electrode
15 Contact-making edge
16 Voltage source
17 Comb structure
18 Conductor structure
19 Finger
20 Motor vehicle
21 Region

The invention claimed is:

1. A multilayer arrangement for a flat glazing unit, wherein
the multilayer arrangement extends in a main plane and has at least one peripheral edge,
the multilayer arrangement comprising:
a functional layer,
a first layer electrode arranged on a first surface side of the functional layer, which first surface side is oriented parallel in relation to the main plane,
a second layer electrode arranged on a second surface side of the functional layer, which second surface side is oriented parallel in relation to the main plane and is situated opposite the first surface side,
wherein the first layer electrode has at least one first contact-making surface which is oriented parallel in relation to the main plane and on which a common first supply electrode, which is different from the first layer electrode, is arranged along a first contact-making edge,
the second layer electrode has at least one second contact-making surface which is oriented parallel in relation to the main plane and on which a common second supply electrode, which is different from the second layer electrode, is arranged along a second contact-making edge, wherein the first and second supply electrodes are arranged between the first and second layer electrodes,
the first contact-making edge and the second contact-making edge are each at least a subregion of the peripheral edge, the first and second supply electrodes each have a comb structure having a plurality of fingers, with the plurality of fingers of the first supply electrode resting on the first contact-making surface and the plurality of fingers of the second supply electrode resting on the second contact-making surface, the plurality of fingers of the first and second supply electrodes are arranged along a direction parallel to the main plane in an alternating order, such that the plurality of fingers of the first supply electrode are intertwined with the plurality of fingers of the second supply electrode, the first and second supply electrodes each include an elongated base surface aligned parallel to the main plane between the first and second layer electrodes from which the plurality of fingers extend as protruding subsurfaces, and clearances are incorporated into the functional layer along the first and second contact-making edge, with the plurality of fingers of the first and second supply electrodes extending into the clearances.

2. The multilayer arrangement as claimed in claim 1, wherein
the functional layer comprises an electrochromic material.

3. The multilayer arrangement as claimed in claim 1, wherein
the first layer electrode and/or the second layer electrode is transparent at least in the visible region.

4. The multilayer arrangement as claimed in claim 1, wherein
a line structure is arranged on a surface side of the first layer electrode and/or of the second layer electrode.

5. The multilayer arrangement as claimed in claim 4, wherein
at least one of the first layer electrode, the second layer electrode, or the line structure have/has nanoflakes and/or nanowires.

6. The multilayer arrangement as claimed in claim 5, wherein at least one of the first layer electrode, the second layer electrode, or the line structure have/has a microwire structure.

7. The multilayer arrangement as claimed in claim 4, wherein
at least one of the first layer electrode, the second layer electrode, or the line structure have/has a microwire structure.

8. The multilayer arrangement as claimed in claim 7, wherein
the microwire structure has an electrode matrix.

9. A switchable glazing unit comprising a multilayer arrangement as claimed in claim 1.

10. A motor vehicle comprising a switchable glazing unit as claimed in claim 9.

11. A motor vehicle comprising a multilayer arrangement as claimed in claim 1.

12. The multilayer arrangement as claimed in claim 1, wherein the supply electrodes are formed from a material which has a higher electrical conductivity than a material of the layer electrodes.

13. The multilayer arrangement as claimed in claim 1, wherein the supply electrodes have a greater layer thickness than the layer electrodes.

* * * * *